United States Patent [19]

Nicetto

[11] Patent Number: 5,406,059
[45] Date of Patent: Apr. 11, 1995

[54] MOLDING MACHINE, PARTICULARLY OF THE CENTRIFUGAL TYPE, FOR LOW MELTING MATERIALS, SYNTHETIC MATERIALS OR THE LIKE

[75] Inventor: Romeo Nicetto, Senago, Italy

[73] Assignee: Nicem S.p.A., Senago, Italy

[21] Appl. No.: 160,627

[22] Filed: Dec. 2, 1993

[30] Foreign Application Priority Data

Jun. 9, 1993 [IT] Italy ................................ MI93A1228

[51] Int. Cl.$^6$ ............................................. G06F 15/46
[52] U.S. Cl. ...................................... 235/376; 235/375
[58] Field of Search ................................. 235/376, 375

[56] References Cited

U.S. PATENT DOCUMENTS 5,316,707  5/1994  Stanciu et al. ...................... 264/40.1

FOREIGN PATENT DOCUMENTS 0070055  1/1983  European Pat. Off. .
0368012  5/1990  European Pat. Off. .
2124967  2/1984  United Kingdom .

OTHER PUBLICATIONS

Patent Abstracts of Japan–vol. 14, No. 361 (M–1006) 6 Aug. 1990– & JP-A-02128805 (Japan Steel Works Ltd.) 17 May 1990–abstract.
Patent Abstracts of Japan–vol. 14, No. 287 (M–988) 21 Jun. 1990 & JP-A-02089561 (Mazda Motor Corp) 29 Mar. 1990–abstract.
Patent Abstracts of Japan–vol. 14, No. 315 (M–995) 6 Jul. 1990 & JP-A-02106308 (Yuushin Seiki: KK) 18 Apr. 1990–abstract.
Patent Abstracts of Japan–vol. 14, No. 395 (M–1016) 27 Aug. 1990– & JP-A-02150328 (Sumitomo Heavy Ind Ltd.) 8 Jun. 1990 abstract.
Patent Abstracts of Japan–vol. 7 No. 283 (M–263)(1428) 16 Dec. 1983 & JP-A-58158230 (Nitsusei Jiyushi Kogyo KK) 20 Sep. 1983–abstract.
Patent Abstracts of Japan–vol. 10, No. 138 (M–480)(2195) 21 May 1986 & JP-A-60260312 (Aida Engineering KK) 20 Dec. 1984 abstract.
Patent Abstracts of Japan–vol. 16, No. 335 (M–1283) 21 Jul. 1992– & JP-A-04099608 (Pfu ltd) 31 Mar. 1992–abstract.

*Primary Examiner*—Davis L. Willis
*Assistant Examiner*—Peter J. Rashid
*Attorney, Agent, or Firm*—Guido Modiano; Albert Josif

[57] ABSTRACT

Molding machine, particularly of the centrifugal type, for low-melting materials, synthetic materials or the like, including readers for reading reference markings located on one side of a mold; these readers are connected to a programmable logic controller, which supervises the operation of the machine, for the automatic selection of the molding parameters according to the mold used.

15 Claims, 2 Drawing Sheets

MOLDING MACHINE, PARTICULARLY OF THE CENTRIFUGAL TYPE, FOR LOW MELTING MATERIALS, SYNTHETIC MATERIALS OR THE LIKE

BACKGROUND OF THE INVENTION

The present invention relates to a molding machine, particularly of the centrifugal type, for low-melting materials, synthetic materials or the like.

Automatic or semiautomatic machines for centrifugal molding for low-melting metals or synthetic materials are known. Use of these machines entails a diversification in production that always requires the changing of the mold which is used. It is thus necessary to vary the molding parameters, such as for example the mold closing pressure, the centrifugation rate, the centrifugation time and the amount of material, in order to adapt them to the type of the mold.

In semiautomatic machines, in which the material to be molded is fed manually, dosage of the material is entrusted to the operator, who also sets the other molding parameters by manually adjusting potentiometers, timers and pressure regulators, which are located on the control panel of the machine.

Automatic machines, in which the material is automatically fed to the mold, are sometimes driven by programmable logic controllers, commonly known as PLCs, which however only store the machine cycle. Even in these automatic machines, some of the molding parameters, such as for example the centrifugation rate and the mold closing pressure, do not involve the PLC and must be in any case adjusted directly by the operator. The centrifugation time and the pouring time, while being handled by the PLC, are also adjusted by the operator.

Automation of these machines by means of programmable logic controllers, whilst allowing rapid changes in production by varying the molding parameters, has nonetheless failed to fully solve the problems linked to production changes. Alteration of the molding parameters is in fact entrusted to the operator himself, who must also prepare the molds, arrange them on the machine, remove the used molds from the machine and remove the formed parts from the molds.

Alteration of the molding parameters, which can be required even after the filling of a single mold, thus turns out to be a critical operation, since it can cause defective production runs due to incorrect setting of the molding parameters with reference to the mold being used.

This problem increases as the number of required production changes rises, as occurs for example in the machines used to produce costume-jewellery items or small parts made of metal with low-melting alloys, or made of polyester- or polyurethane-based resins, epoxy resins or other synthetic materials, which require considerable diversification of production, for example to follow the trends of fashion.

SUMMARY OF THE INVENTION

The aim of the present invention is to solve the problem described above by providing a machine which can automatically adapt the molding parameters according to the mold to be used.

Within the scope of this aim, an object of the invention is to provide a machine which, by eliminating the need of manual interventions for selecting the molding parameters, significantly reduces the work load of the operator assigned to the machine.

Another object of the invention is to provide a machine which can control the production of each mold and communicate with external systems so as to allow general production management.

Another object of the invention is to provide a machine which by optimizing production and reducing manufacturing waste allows to reduce production costs with respect to conventional machines.

This aim, these objects and others which will become apparent hereinafter are achieved by a molding machine, particularly of the centrifugal type, for low-melting materials, synthetic materials or the like, characterized in that it comprises means for reading reference markings located on one side of a mold, said reading means being connected to a programmable logic controller, which supervises the operation of the machine, for the automatic selection of the molding parameters according to the mold used.

BRIEF DESCRIPTION OF THE DRAWINGS

Further characteristics and advantages of the invention will become apparent from the following detailed description of a preferred but not exclusive embodiment of a machine according to the invention, illustrated only by way of non-limitative example in the accompanying drawings, wherein.

DESCRIPTION OF THE PREFERRED EMBODIMENTS

Figure 2:
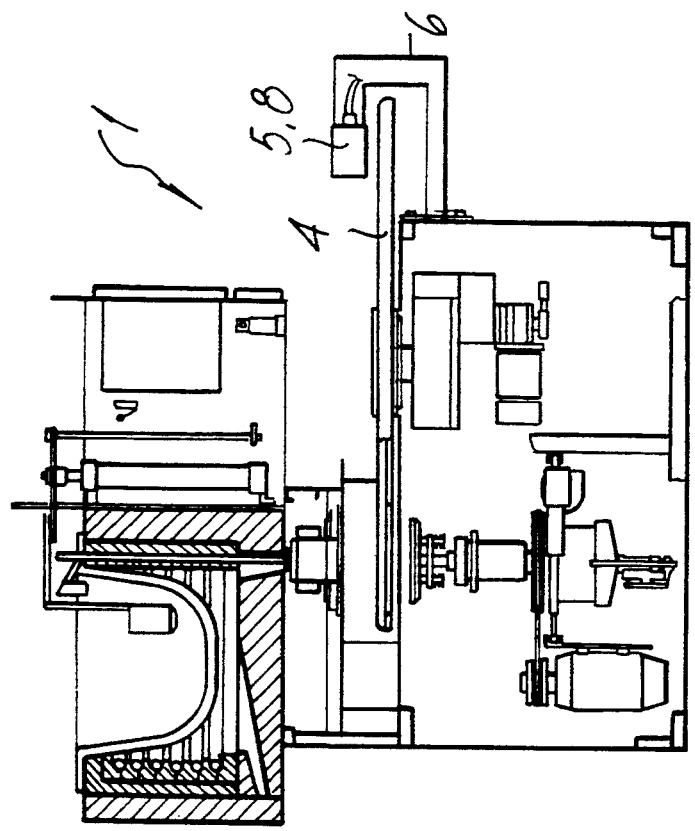
FIG. 2 is a schematic elevation sectional view of the machine according to the invention.
Figure 1:
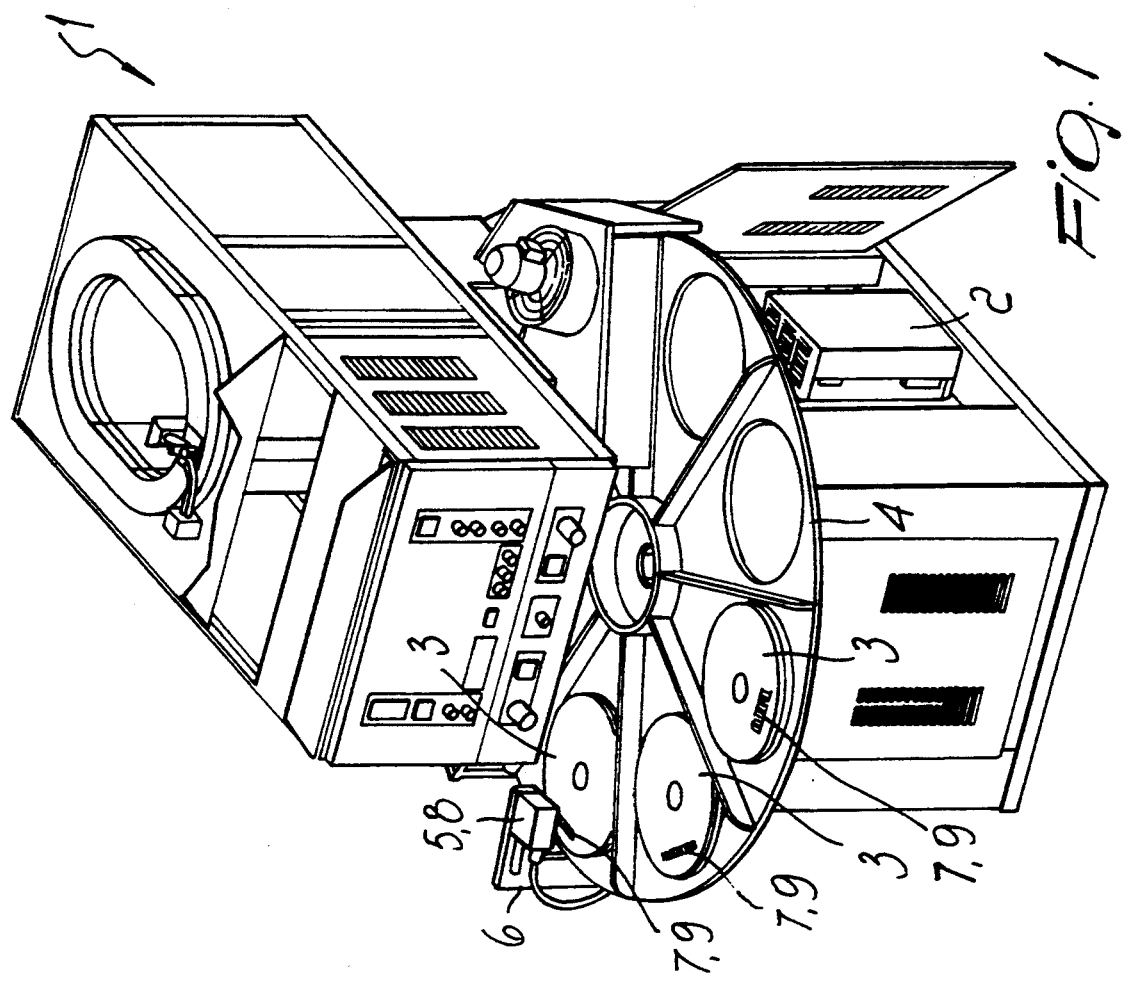
FIG. 1 is a perspective view of a machine according to the invention.
Figure 3:
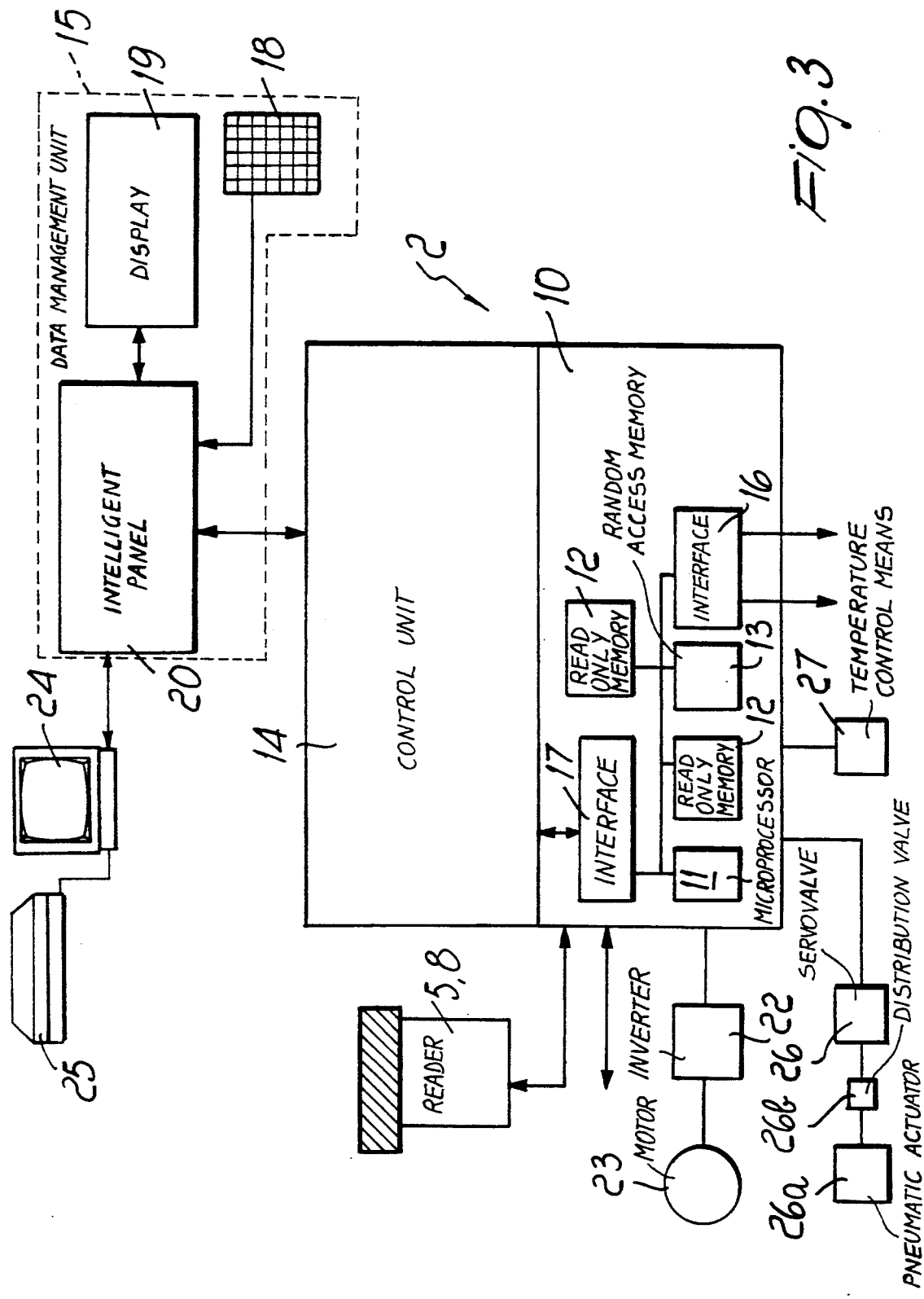
FIG. 3 is a block diagram of the control section of the machine according to the invention.

With reference to the above figures, the machine according to the invention, generally designated by the reference numeral 1, is constituted by a molding machine, particularly of the centrifugal type, for low-melting metals or synthetic materials, provided with a programmable logic controller (PLC) 2.

According to the invention, means for reading reference markings arranged on one side of a mold 3 are fixed to the machine 1. The molds 3 can be arranged for example on a carousel 4. The reading means are rigidly coupled to the machine 1 and electrically connected to the programmable logic controller 2 to select the molding parameters for the specific mold.

In a first embodiment, the reading means comprise at least one optical reader 5 which is fixed to the machine 1 by means of a bracket 6, and the reference markings include bar codes 7 applied to the mold 3. The bar codes 7 can be formed on a plate which is applied, for example during or after vulcanization, to the mold itself, or can be hot-stamped or printed on the mold itself after it has been vulcanized.

In a second embodiment, the reading means comprise at least one magnetic reader 8 which is fixed to the machine 1 by means of the bracket 6, and the reference markings comprise a magnetic strip 9 which stores coded data and is rigidly coupled to the associated mold. The magnetic strip 9 is constituted, as it is known, by a portion of magnetic tape which is fixed, by glueing or other means, to the outer surface of the mold, and the information related to the rotation and times rates of the mold during molding are memorized on it.

The reading means, whether constituted by an optical reader 5 or by a magnetic reader 8, are connected to a connection interface 10 of the programmable logic controller 2. The read-only data arriving from the readers 5 and 8 and from the other peripheral units of the programmable logic controller 2 are handled by the interface 10. The interface 10 has at least one microprocessor 11 which has read-only memories 12 and a random-access memory 13 and interfaces 16 and 17 for communicating both with a control unit 14 of the controller 2 and for the peripheral units and with departmental computers which are not shown. The instructions for the operation of the microprocessor, such as the operating system and the control and diagnostic codes, are stored in the read-only memories 12, whereas the random-access memory can contain a list of configurations, provided for example by connection to departmental computers, of the different moldings to be performed.

The control unit 14 for the controller 2, which controls the interface 10 and the other peripheral units of the controller 2, has its own random-access memory in which the user program, including the data for the molds, is handled and stored.

In one embodiment, the reference markings represent a unique number related to a particular type of mold, whereas the basic parameters related to the molding of that particular type of mold and to its corresponding unique number are entered into the random-access memory of the controller 2 by keying on the keyboard 18 of the control and data management unit 15, whereas an intelligent panel 20, included in the unit 15, transmits the data to the controller 2 (and to its random-access memory).

In a second embodiment, the reference markings represent all the parameters related to the current molding of a particular mold.

The data related to the molding can be the mold closing pressure, the centrifugation rate, the centrifugation time, or in any case the cooling time of the metal or the cross-linking time of the resins, the amount of metal to be fed into the mold, and the temperature of the molten metal used for the molding.

A control and data management unit 15 is connected to the controller 2, as mentioned above, and comprises an intelligent panel 20 which is provided with a keyboard 18 and a display 19. In case of malfunction of the reader 5 (8), the selection of the molds is handled by the intelligent panel 20, furthermore allowing to change the intrinsic variables of the molds themselves. The intelligent panel 20 furthermore allows to view in real time, by means of the display 19, the data related to the processed molds. The panel 20 furthermore handles messaging and diagnostics between the controller 2 and the control and data management unit 15. A PC-type computer 24, with its printer 25, is connected to the panel 20 by means of a serial line.

The controller 2 is furthermore connected, by means of an analog output, to a servovalve 26 located on the feed line of a known pneumatic actuator 26a, which opens and closes the mold. The controller 2 adjusts the degree of opening of the servovalve 26 according to the mold closing pressure entered in the random-access memory of the controller 2.

The controller 2 can also be connected, through a digital output, to a distribution valve 26b, which is arranged on the feed line of the pneumatic actuator for closing or opening the mold, so as to open the mold after a preset time, after the pouring of the material, which is entered as a parameter in the random-access memory of the controller 2.

The machine furthermore has voltage frequency conversion means 22, advantageously constituted by an inverter, which drive the centrifugation motor 23 of the machine 1. Since the conversion means 22, powered by mains voltage, are also a peripheral unit, they are controlled by the controller 2 by means of the interface 10.

The controller 2 controls the centrifugation time by actuating the motor 23 for a preset period of time which is entered as a parameter in the random-access memory of the controller 2.

Finally, the controller 2 can be provided with analog outputs and inputs for controlling the temperature of the molten metal used for molding. These outputs and inputs are associated with means 27 for controlling the temperature of the molten material.

Operation of the machine according to the invention is as follows: the reader 5 (8) reads the information provided on the mold 3 by the bar codes 7 (by the magnetic strips 9), converts them and sends them to the interface 10, where after an appropriate delay they are sent to the various units of the machine 1 in order to adjust the rotation of the centrifugation motor 23 and the period of time for which the mold remains in the machine 1, identifying each individual different molding, or each individual molding operation, by means of the information collected by the reader 5 (8), with no intervention of the operator on the keyboards 18. The rotation rate of the motor 23 is adjusted by varying the frequency of the supply voltage of said motor, by virtue of the voltage frequency conversion means 22. The data related to the molding in progress can be viewed on the display 19. The intelligent control panel 20 exchanges data and/or instructions with the controller 2, and in case of malfunction of the reader 5 (8) provides the computer 24 with data related to the molding. The computer 24 handles the data related to the molding so as to offer statistics and/or reports related to production (molding). These data and reports can be printed by means of the printer 25.

Practical tests have shown that the present invention achieves the intended aim and objects, advantageously automating some molding operations and conveniently reducing the work load of the operator assigned to molding. Furthermore, by means of this application it is also possible to automate the molding operation, further reducing the presence of operators at the machine 1.

Although the basic concept of the invention has been conceived particularly for machines for centrifugal-type molding, it can in any case be used, without however abandoning the protective scope of the present invention, in all machines that form by molding in which variation in the molding parameters according to the mold in use is required, such as for example machines for injection-forming, machines for forming, by molding, wax models to be used in lost-wax casting processes, etc.

The invention thus conceived is susceptible to numerous modifications and variations, all of which are within the scope of the inventive concept. All the details may furthermore be replaced with other technically equivalent elements.

In practice, the materials employed, as well as the dimensions, may be any according to the requirements.

I claim:

1. Molding machine, particularly of the centrifugal type, for low-melting materials or synthetic materials, wherein it comprises means for reading reference markings located on one side of a mold, said reading means being connected to a programmable logic controller, which supervises the operation of the machine, for the automatic selection of the molding parameters according to the mold used.

2. Machine according to claim 1, wherein said reading means comprise at least one optical reader and that said reference markings comprise bar codes applied on said mold.

3. Machine according to claim 1, wherein said reading means comprise at least one magnetic reader and that said reference markings comprise a magnetic strip which contains coded data and is rigidly coupled to the mold.

4. Machine according to claim 1, wherein said reading means are connected to an interface for connecting said programmable logic controller, said interface having at least one microprocessor provided with memories and interfaces for communication both with said controller, peripheral units and with departmental computers.

5. Machine according to claim 1, wherein said programmable logic controller comprises a control unit which is suitable to control said interface and the peripheral units of said controller.

6. Machine according to claim 1, wherein it comprises voltage frequency conversion means which are driven by said controller and suitable to adjust, according to said molding parameters, the rotation rate of a centrifugation motor which actuates said mold with a rotary motion.

7. Machine according to claim 1, wherein it comprises means for controlling the centrifugation time.

8. Machine according to claim 1, wherein it comprises means for controlling the closing pressure of the mold, said closing pressure control means being controlled by said programmable logic controller.

9. Machine according to claim 8, wherein said means for controlling the mold closing pressure comprise a servovalve arranged on the feed line of a pneumatic actuator for closing the mold.

10. Machine according to claim 1, wherein it comprises means for controlling the pouring time.

11. Machine according to claim 10, wherein said means for controlling the molding time comprise a distribution valve which is arranged on the feed line of said pneumatic actuator and driven by said programmable logic controller.

12. Machine according to claim 1, wherein it comprises means for controlling the temperature of the molten material, said means being connected to said programmable logic controller.

13. Machine according to claim 1, wherein it comprises an intelligent control panel suitable to exchange instructions and/or data related to molding with said controller.

14. Machine according to claim 13, wherein said intelligent control panel is suitable to display, real time, the data related to the molding in progress.

15. Machine according to claim 13, wherein it comprises a computer which is associated with said panel and suitable to handle data related to the molding in progress.

* * * * *